US008195050B2

(12) United States Patent
Matsuyama et al.

(10) Patent No.: US 8,195,050 B2
(45) Date of Patent: Jun. 5, 2012

(54) OPTICAL TRANSMISSION APPARATUS, SUBSCRIBER APPARATUS AND OPTICAL COMMUNICATION SYSTEM

(75) Inventors: Toru Matsuyama, Kawasaki (JP); Shinichi Sakuramoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 555 days.

(21) Appl. No.: 12/405,832

(22) Filed: Mar. 17, 2009

(65) Prior Publication Data

US 2009/0238562 A1  Sep. 24, 2009

(30) Foreign Application Priority Data

Mar. 24, 2008 (JP) ................. 2008-075993

(51) Int. Cl.
*H04J 14/08* (2006.01)
*H04B 10/08* (2006.01)
*H04B 10/00* (2006.01)
(52) U.S. Cl. ............ 398/102; 398/38; 398/101
(58) Field of Classification Search ........... 398/102, 398/35, 38, 66–67, 161
See application file for complete search history.

(56) References Cited

U.S. PATENT DOCUMENTS

| 2008/0025724 A1* | 1/2008 | Ozaki ............... 398/68 |
| 2008/0050116 A1* | 2/2008 | Nakaishi et al. ........ 398/43 |

FOREIGN PATENT DOCUMENTS

| JP | 1-170243 | 7/1989 |
| JP | 11-88234 | 3/1999 |
| JP | 2002-171159 | 6/2002 |
| JP | 2003-18174 | 1/2003 |
| JP | 2005-135283 | 5/2005 |
| JP | 2007-27819 | 2/2007 |
| JP | 2007-89065 | 4/2007 |

OTHER PUBLICATIONS

Communication from the Japanese Patent Office dated Mar. 30, 2010 in the related Japanese patent application No. 2008-075993.
Communication from the Japanese Patent Office dated Dec. 22, 2009 in the related Japanese patent application No. 2008-075993.

* cited by examiner

*Primary Examiner* — Dawayne A Pinkney
(74) *Attorney, Agent, or Firm* — Staas & Halsey LLP (57) ABSTRACT

An optical transmission apparatus communicable with a plurality of subscriber including a delay measuring part for detecting a response delay time from each subscriber based on reception timing of the delay measurement response optical packet, a detection part for detecting a received optical level of the delay measurement response optical packet received by the reception part and a state determination part for determining quality of an optical transmission state between the optical transmission apparatus and each subscriber based on the received optical level of the delay measurement response optical packet of each of the plurality of subscribers.

9 Claims, 13 Drawing Sheets

OPTICAL TRANSMISSION APPARATUS, SUBSCRIBER APPARATUS AND OPTICAL COMMUNICATION SYSTEM

CROSS-REFERENCE TO RELATED APPLICATION

This application is based upon and claims the benefit of priority of the prior Japanese Patent Application No. 2008-075993, filed on Mar. 24, 2008, the entire contents of which are incorporated herein by reference.

BACKGROUND

1. Field

The present invention relates to an optical transmission apparatus, a subscriber apparatus and an optical communication system, and in particular, relates to an optical communication system that performs optical communication by means of an optical network including a plurality of subscriber apparatuses and an optical transmission apparatus that performs communication with the plurality of subscriber apparatuses, and an optical transmission apparatus and a subscriber apparatus constituting the optical communication system.

2. Description of the Related Art

In recent years, with widespread use of the Internet, information communication networks have penetrated into families and enterprises and optical subscriber system networks are evolving to provide faster large-capacity services. As a concrete optical subscriber system, for example, a PON (Passive Optical Network) system is widely being adopted.

Figure 12:
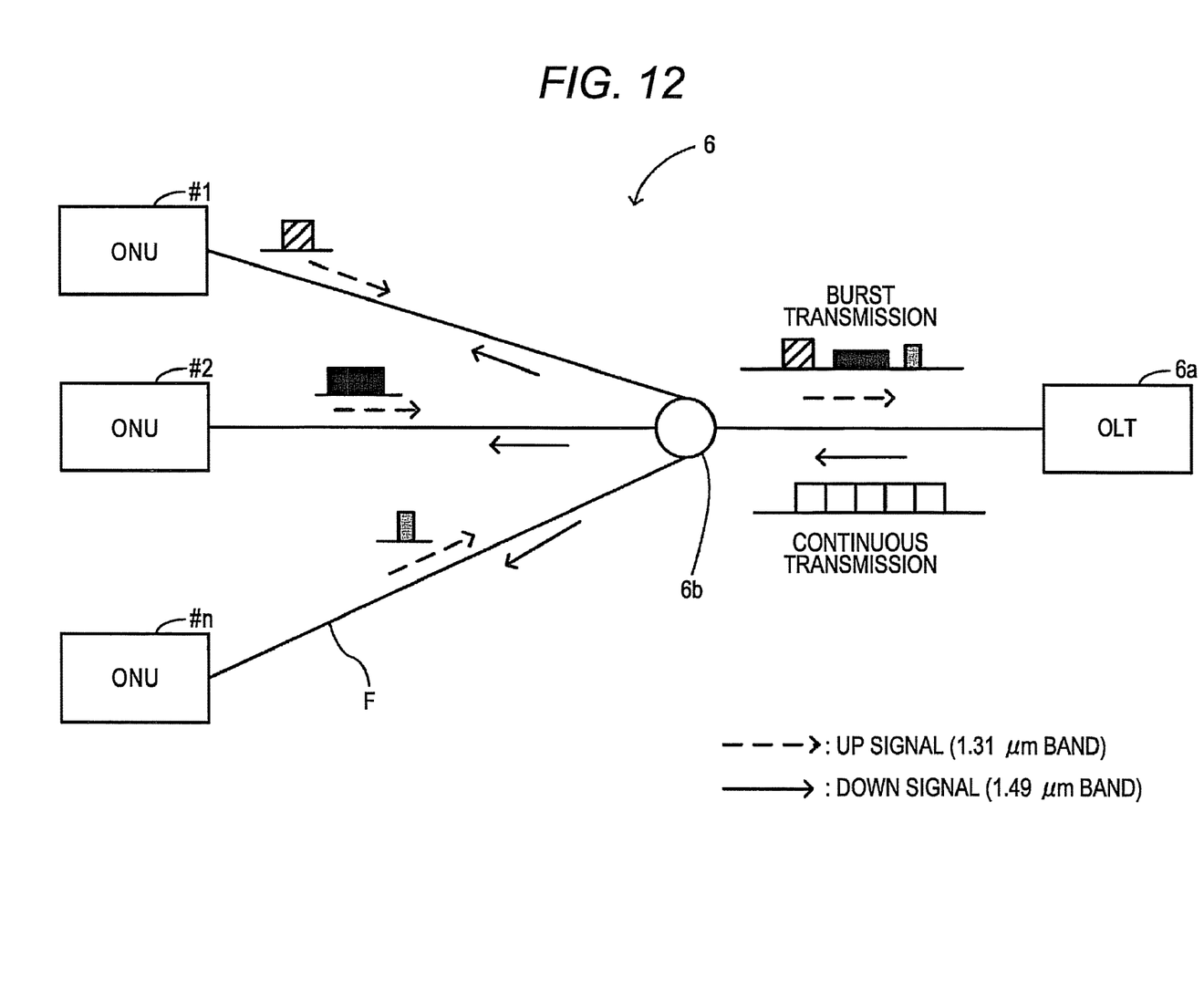
FIG. 12 is a diagram showing the configuration of a PON system.

FIG. 12 is a diagram showing the configuration of a PON system. A PON system 6 includes an OLT (Optical Line Terminal) 6a set up on the office side, ONUs (Optical Network Units) #1 to #n set up on the subscriber side, and an optical passive-element star coupler 6b that performs optical demultiplexing/multiplexing.

The OLT 6a and the ONUs #1 to #n are 1-to-n connected by an optical fiber F via the star coupler 6b to perform optical packet communication between the OLT 6a and the ONUs #1 to #n. The wavelength used is generally 1.31 μm in the up direction (ONU→OLT) and 1.49 μm in the down direction (OLT→ONU).

While down signals are transmitted continuously, up signals are transmitted in burst mode so that up signals from different ONUs should not collide with each other. Since the transmission distance between the OLT 6a and the ONUs #1 to #n is different from ONU to ONU, optical packets of different levels will be received.

Here, when a system is being constructed, the OLT 6a transmits a delay measurement instruction optical packet to each ONU. The ONU that receives a delay measurement instruction optical packet and recognizes that the optical packet is addressed to the ONU transmits a return packet to the OLT 6a.

Based on the reception timing of return packets, the OLT 6a recognizes the propagation delay time (transmission distance) between the OLT 6a and each ONU and decides the transmission timing when the ONUs #1 to #n transmit packets so that such packets should not collide with each other. Then, the OLT 6a notifies each ONU of the transmission timing decided for the ONU and the ONU transmits packets to the OLT 6a based on the notified transmission timing to realize transmission in burst mode without mutual collision in the up direction.

A technology to determine, when a collision of a data cell transmitted from an ONU and a distance measurement cell transmitted from another ONU is detected, the transmission distance between the ONU that transmitted the distance measurement cell and an OLT is proposed by Japanese Patent Application Laid-Open No. 2003-18174 as conventional technology.

The function to measure the propagation delay time as described above is generally called ranging. In the ranging, the propagation delay time between the OLT 6a and the ONUs #1 to #n is determined by recognizing which position of a delay measurement window a return packet from the ONUs #1 to #n enters after a delay measurement instruction optical packet is transmitted from the OLT 6a. The delay measurement window is a time range from the minimum value to the maximum value of the reception timing when return packets are received.

Figure 13:
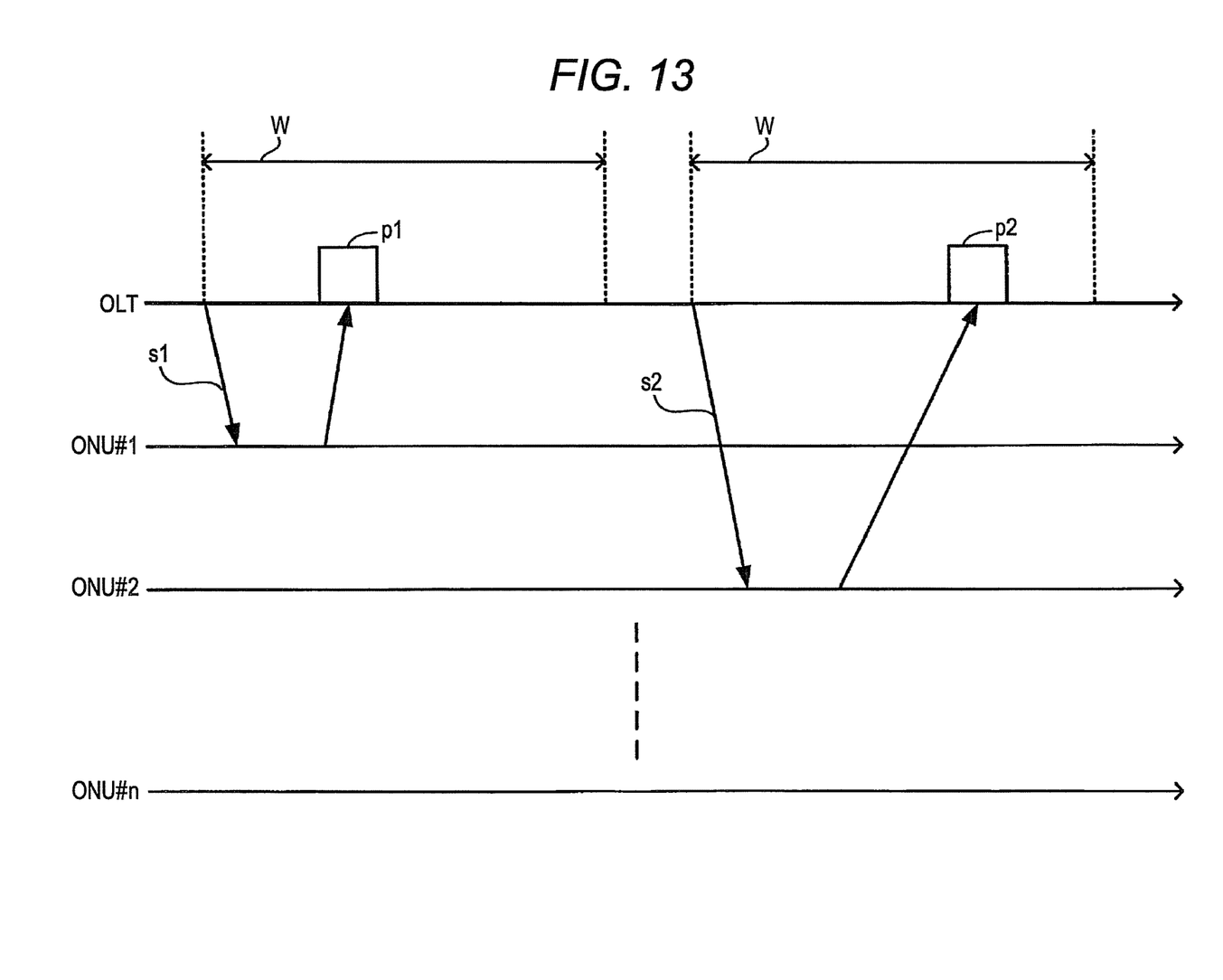
FIG. 13 is a diagram showing a state of ranging.

FIG. 13 is a diagram showing a state of ranging. The OLT 6a transmits a delay measurement instruction optical packet s1 containing an identifier addressed to the ONU #1. The delay measurement instruction optical packet s1 reaches all of the ONUs #1 to #n, but the ONU #1 recognizes that the delay measurement instruction optical packet s1 is addressed to the ONU #1 and thus, only the ONU #1 captures the delay measurement instruction optical packet s1 and transmits a return packet p1 to the OLT 6a. Then, the OLT 6a recognizes the reception timing of the return packet p1 entering a delay measurement window W.

Similarly, the OLT 6a transmits a delay measurement instruction optical packet s2 containing an identifier addressed to the ONU #2 and the ONU #2 transmits a return packet p2 to the OLT 6a. Then, the OLT 6a recognizes the reception timing of the return packet p2 entering the delay measurement window W.

Since the return packet p1 reaches the OLT 6a earlier than the return packet p2 in FIG. 13, it is clear that the propagation delay time related to the ONU #1 and the OLT 6a is shorter than that related to the ONU #2 and the OLT 6a (The ONU #1 is positioned nearer to the OLT 6a than the ONU #2).

In this manner, the OLT 6a transmits a delay measurement instruction optical packet to each ONU and recognizes the propagation delay time related to the OLT 6a and each of the ONUs #1 to #n based on the reception timing of the return packet returned from each ONU in the delay measurement window W to decide the transmission timing for each of the ONUs #1 to #n so that information packets transmitted by each ONU during system operation should not collide with each other.

However, in conventional ranging, only the reception timing of a return packet from an ONU entering a delay measurement window is detected and the state of an optical level of a return packet transmitted from the ONU is not determined.

Thus, the state of light transmission from an ONU and the state of transmission paths cannot be detected during ranging. For example, if an ONU being ranged emits light abnormally or an optical loss arises due to a failure of an optical transmission path between an ONU and an OLT (such as an occurrence of optical loss by using an optical fiber generally made available), quality of such optical propagation cannot be determined during execution of ranging.

Since the above ranging is generally performed when an optical fiber is deployed to construct a PON system, it is preferable that quality of optical propagation between ONUs and the OLT be recognizable, as well as a decision of the transmission timing of ONUS, to improve maintainability.

The present invention has been developed in view of the above circumstances and an object thereof is to provide an optical communication system capable of determining quality of an optical transmission state between a station and subscribers by measuring the propagation delay time and also detecting the optical level of packets transmitted from subscribers during execution of ranging.

SUMMARY

An optical transmission apparatus communicable with a plurality of subscriber apparatuses including a delay measurement instruction optical packet transmission part transmitting a delay measurement instruction optical packet, a reception part receiving a delay measurement response optical packet returned from each of the plurality of subscribers, a delay measuring part detecting a response delay time from each subscriber based on reception timing of each of the delay measurement response optical packets, a detection part detecting a received optical level of each of the delay measurement response optical packets received by the reception part, and a state determination part determining a quality of an optical transmission state between the optical transmission apparatus and each subscriber based on the received optical level of the delay measurement response optical packet of each of the plurality of subscribers.

A subscriber apparatus connected to an optical transmission apparatus communicable with a plurality of subscriber apparatuses including a delay measurement response interface part that receives a delay measurement instruction optical packet transmitted from the optical transmission apparatus to determine whether or not the delay measurement instruction optical packet is addressed to the subscriber apparatus and, if the delay measurement instruction optical packet is addressed to the subscriber apparatus, outputs a delay measurement response optical packet and an emission quantity control part controlling an optical output level of the delay measurement response optical packet when a message to control the optical output level is received after the delay measurement response optical packet is output.

An optical communication system performing communication by means of an optical network, including an optical transmission apparatus having a delay measurement instruction optical packet transmission part transmitting a delay measurement instruction optical packet, a reception part receiving a delay measurement response optical packet returned from each of a plurality of subscriber apparatuses, a delay measuring part detecting a response delay time from each subscriber apparatus based on reception timing of each of the delay measurement response optical packets, a detection part detecting a received optical level of each of the delay measurement response optical packets received by the reception part, and a state determination part determining a quality of an optical transmission state between the optical transmission apparatus and each subscriber apparatus based on the received optical level of the delay measurement response optical packet of each of the plurality of subscriber apparatuses. The system further includes a plurality of subscriber apparatuses, each subscriber apparatus, including a delay measurement response interface part that receives a delay measurement instruction optical packet transmitted from the optical transmission apparatus to determine whether or not the delay measurement instruction optical packet is addressed to the subscriber apparatus and, if the delay measurement instruction optical packet is addressed to the subscriber apparatus, outputs a delay measurement response optical packet and an emission quantity control part controlling an optical output level of the delay measurement response optical packet when a message to control the optical output level is received after the delay measurement response optical packet is output.

DESCRIPTION OF EMBODIMENTS

Figure 1:
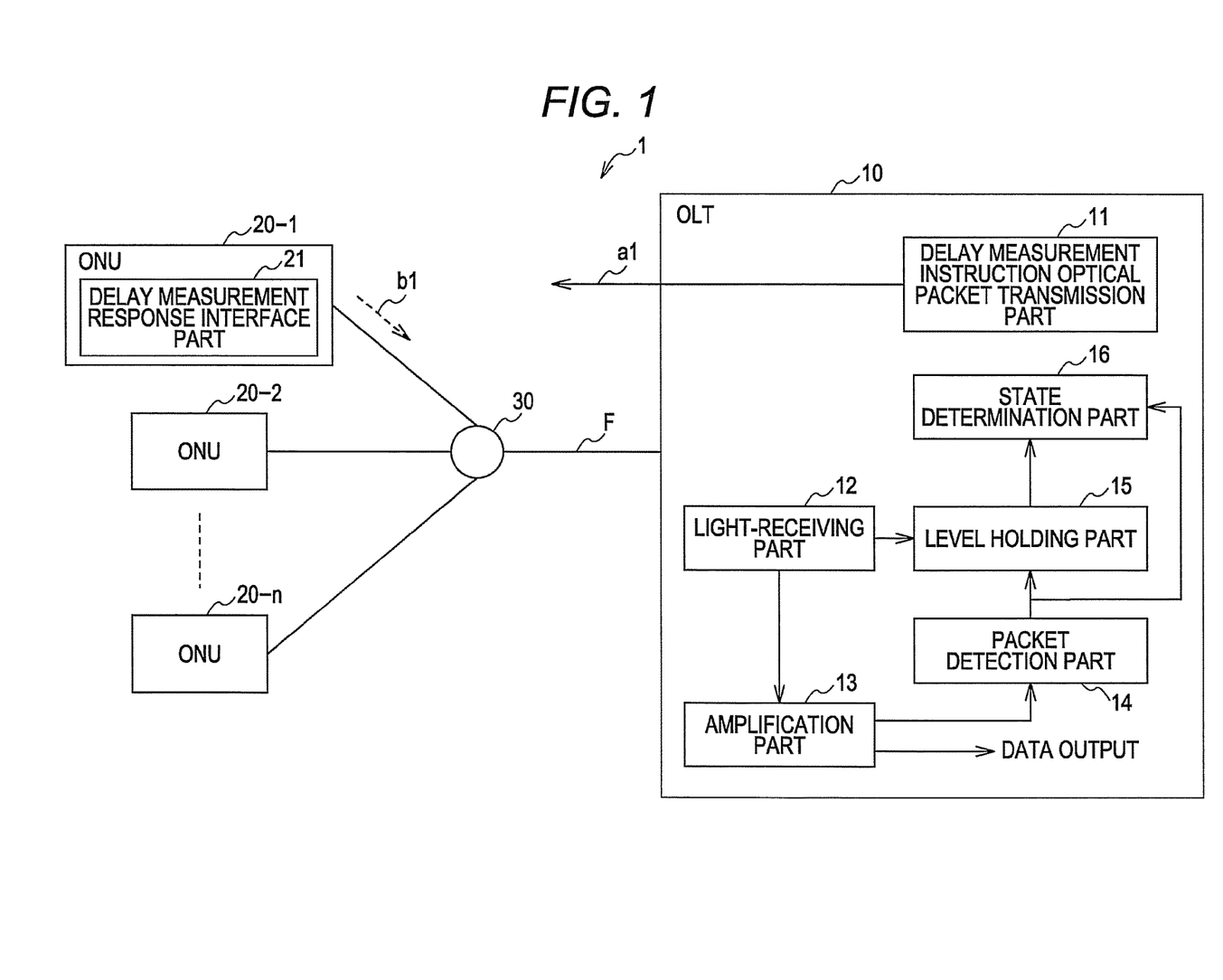
FIG. 1 is a diagram showing the configuration of an optical communication system.

An embodiment of the present invention will be described with reference to the drawings. FIG. 1 is a diagram showing the configuration of an optical communication system. An optical communication system 1 is a system that performs optical communication by means of an optical subscriber system network including an OLT (Optical Line Terminal) 10 as an optical transmission apparatus set up on the station side, ONUs (Optical Network Units) 20-1 to 20-$n$ as n subscriber apparatuses set up on the subscriber side, and a star coupler 30.

The OLT 10 includes a delay measurement instruction optical packet transmission part 11, a light-receiving part 12, an amplification part 13, a packet detection part 14, a level holding part 15, and a state determination part 16. The delay measurement instruction optical packet transmission part 11 transmits a delay measurement instruction optical packet a1 for measuring the propagation delay time (performing ranging) of an optical signal between the station and a subscriber.

The light-receiving part 12 receives a delay measurement response optical packet b1 returned by each subscriber and converts the optical packet into an electric signal. The amplification part 13 amplifies the electric signal. The packet detection part 14 detects reception of the delay measurement response optical packet b1 based on an output signal from the amplification part 13 and outputs a packet detection signal. The level holding part 15 holds the level of an electric signal by using the packet detection signal as a trigger. The state determination part 16 recognizes a propagation delay time based on the reception timing of the delay measurement response optical packet and also determines an optical transmission state of the electric signal between the station and a subscriber.

The ONUs 20-1 to 20-n include a delay measurement response interface part 21. The delay measurement response interface part 21 receives the delay measurement instruction optical packet a1 and transmits the delay measurement response optical packet b1 to the OLT 10. The star coupler 30 connects the OLT 10 and the ONUs 20-1 to 20-n through an optical transmission path F.

Figure 2:
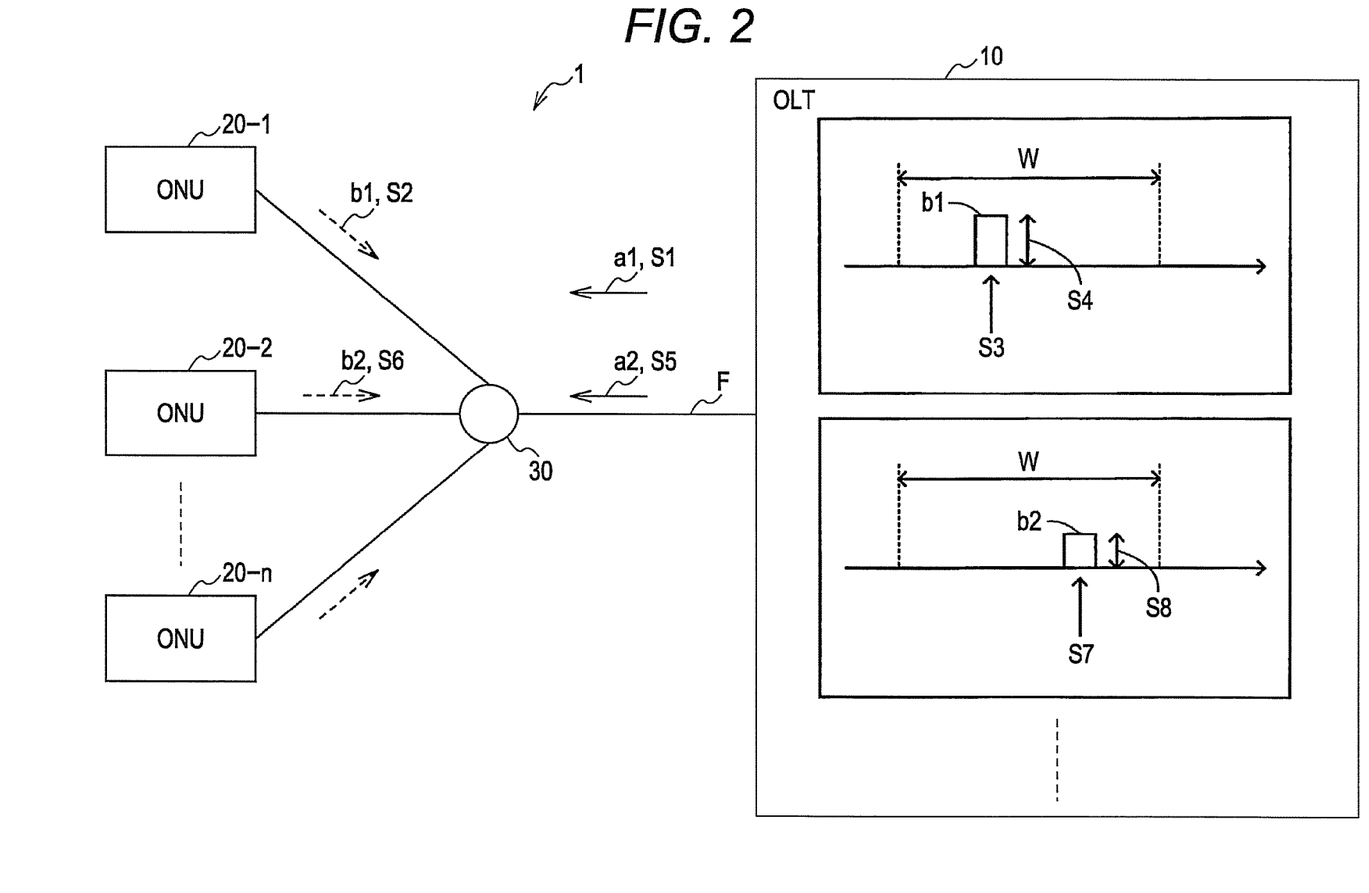
FIG. 2 is a diagram showing an operation of the optical communication system during ranging.

FIG. 2 is a diagram showing an operation of the optical communication system 1 during ranging. That is, an operation when being ranged between the OLT 10 and the ONUs 20-1 to 20-n is shown.

[S1] The delay measurement instruction optical packet transmission part 11 transmits the delay measurement instruction optical packet a1 containing the identifier of the ONU (supposed to be the ONU 20-1) to be measured.

[S2] The delay measurement instruction optical packet a1 reaches all of the ONUs 20-1 to 20-n, but the ONU 20-1 recognizes that the delay measurement instruction optical packet a1 is addressed to the ONU 20-1 based on the identifier contained in the delay measurement instruction optical packet a1 and thus, only the delay measurement response interface part 21 of the ONU 20-1 captures the delay measurement instruction optical packet a1 and transmits the delay measurement response optical packet b1 to the OLT 10.

[S3] The state determination part 16 of the OLT 10 recognizes the reception timing of the delay measurement response optical packet b1 entering the delay measurement window W.

[S4] The state determination part 16 recognizes the optical level of the delay measurement response optical packet b1 based on the level held after the delay measurement response optical packet b1 is converted into an electric signal.

[S5] The delay measurement instruction optical packet transmission part 11 transmits a delay measurement instruction optical packet a2 containing the identifier of the ONU (supposed to be the ONU 20-2) to be measured.

[S6] The delay measurement instruction optical packet a2 reaches all of the ONUs 20-1 to 20-n, but the ONU 20-2 recognizes that the delay measurement instruction optical packet a2 is addressed to the ONU 20-2 based on the identifier contained in the delay measurement instruction optical packet a2 and thus, only the delay measurement response interface part 21 of the ONU 20-2 captures the delay measurement instruction optical packet a2 and transmits a delay measurement response optical packet b2 to the OLT 10.

[S7] The state determination part 16 of the OLT 10 recognizes the reception timing of the delay measurement response optical packet b2 entering the delay measurement window W.

[S8] The state determination part 16 recognizes the optical level of the delay measurement response optical packet b2 based on the level held after the delay measurement response optical packet b2 is converted into an electric signal.

The above control is exercised sequentially for the unmeasured ONUs 20-3 to 20-n to acquire reception timings of the delay measurement response optical packets from the ONUs 20-1 to 20-n of all subscribers connected to the star coupler 30 and optical levels of the delay measurement response optical packets.

Then, the OLT 10 recognizes the propagation delay time (transmission distance) between the OLT 10 and the ONUs 20-1 to 20-n based on the reception timings of the ONUs 20-1 to 20-n respectively, decides transmission timings so that packets transmitted by each ONU will not collide with each other, and notifies each of the ONUs 20-1 to 20-n of the transmission timing decided for each ONU. The ONUs 20-1 to 20-n transmit packets to the OLT 10 based on the notified transmission timings.

By performing determination processing whether or not optical levels obtained from each of the ONUs 20-1 to 20-n are within the range of desired levels, the OLT 10 recognizes quality of the optical transmission state of each of the ONUs 20-1 to 20-n or that of the optical transmission path state between the OLT 10 and each of the ONUs 20-1 to 20-n.

The optical communication system 1 is configured in such a way that in ranging performed by the optical communication system 1, as described above, not only is the propagation delay time measured, but also the optical level of a signal light transmitted from each ONU is detected to determine the optical transmission state between the station and subscribers and thus, maintainability for performing maintenance and management of a system can be improved.

Figure 3:
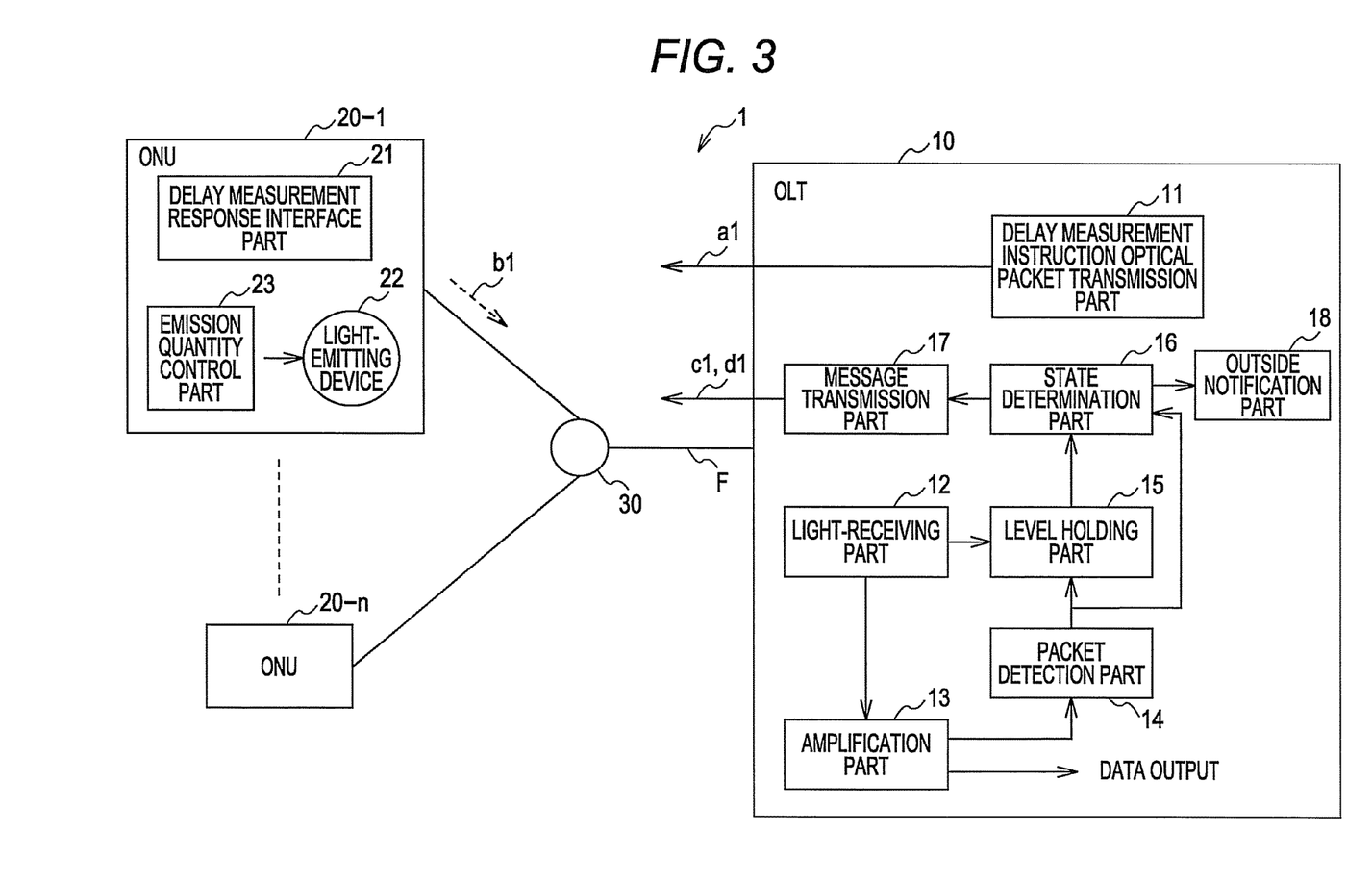
FIG. 3 is a diagram showing the configuration of the optical communication system.

Next, level compensation control of the optical communication system 1 when the optical level of a delay measurement response optical packet is not within the range of desired levels will be described. FIG. 3 is a diagram showing the configuration of the optical communication system 1. The same numerals are attached to the same components as those in FIG. 1 and a description thereof is omitted.

In addition to the components shown in FIG. 1, the OLT 10 has a message transmission part 17 and an outside notification part 18. The message transmission part 17 transmits a message c1 to the applicable ONU (the ONU currently being ranged) when the optical level of the delay measurement response optical packet is not within the range of desired levels.

The message c1 may be realized in a mode in which information about a light-emitting device of the ONU is added to the delay measurement instruction optical packet a1.

The outside notification part 18 is an interface part to notify a maintenance person of determination results of the state determination part 16 (in addition to determination results of the state determination part 16, a maintenance terminal can be notified of system maintenance information collected by the OLT 10).

The ONUs 20-1 to 20-n further include a light-emitting device 22 and an emission quantity adjustment part 23. The light-emitting device 22 is, for example, a semiconductor laser generating an optical signal. The emission quantity adjustment part 23 automatically controls the level of generated light of the light-emitting device 22 based on the message c1 transmitted from the OLT 10.

Figure 4:
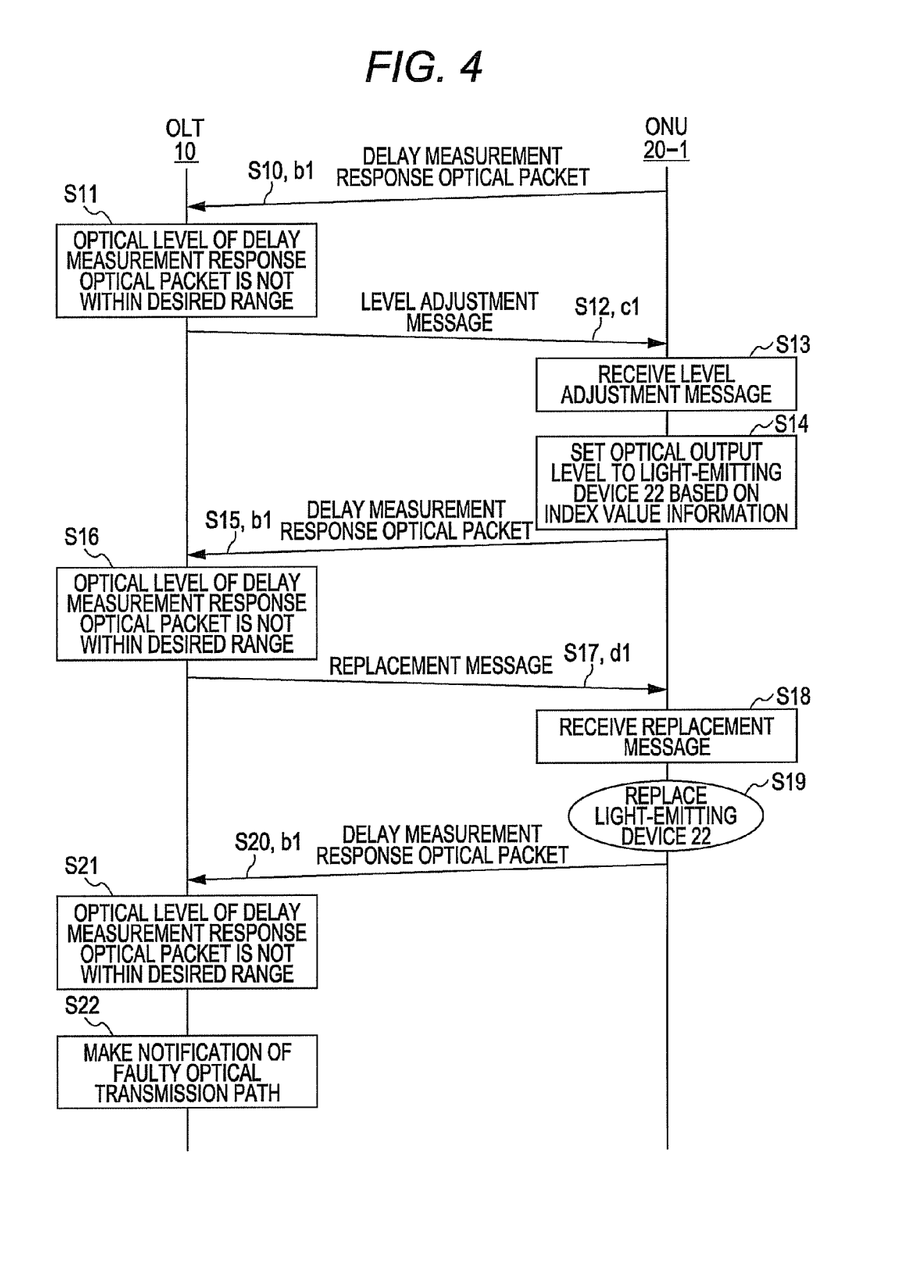
FIG. 4 is a sequence diagram showing an operation of level compensation control.

FIG. 4 is a sequence diagram showing an operation of level compensation control. That is, the flow of level compensation control after the delay measurement instruction optical packet s1 is transmitted by the OLT 10 to the ONU 20-1 is shown.

[S10] After the delay measurement instruction optical packet s1 addressed to the ONU 20-1 is received, the ONU 20-1 transmits the delay measurement response optical packet b1 to the OLT 10.

[S11] The state determination part 16 determines that the optical level of the delay measurement response optical packet b1 transmitted from the ONU 20-1 is not within the range of desired levels.

[S12] The message transmission part 17 transmits the message c1 of level adjustment including increase/decrease index value information to increase/decrease the optical level of the delay measurement response optical packet b1 from the ONU 20-1 so that the optical level enters the range of desired levels.

For example, if the optical level of the delay measurement response optical packet is lower than the range of desired levels, index value information indicating an increase in optical level is included in the message, and if the optical level is higher than the range of desired levels, index value information indicating a decrease in optical level is included. The message c1 of level adjustment also contains the identifier of the ONU 20-1.

[S13] The message c1 of level adjustment reaches all of the ONUs 20-1 to 20-n, but only the ONU 20-1 captures the message of level adjustment based on the identifier of the ONU 20-1 contained in the message c1 of level adjustment.

[S14] Based on increase/decrease index value information contained in the message c1 of level adjustment, the emission quantity adjustment part 23 of the ONU 20-1 sets the level of generated light of the light-emitting device 22 to increase/decrease the optical level of the delay measurement response optical packet.

[S15] The ONU 20-1 retransmits the delay measurement response optical packet b1 after the optical level is adjusted to the OLT 10.

[S16] The OLT 10 receives the delay measurement response optical packet b1 and the state determination part 16 determines whether or not the optical level of the delay measurement response optical packet b1 transmitted from the ONU 20-1 after the level of generated light is corrected is within the range of desired levels. Here, it is assumed that the optical level is not within the range of desired levels.

[S17] The OLT 10 regards the light-emitting device 22 of the ONU 20-1 as degraded and the message transmission part 17 transmits a replacement message d1 including a replacement instruction to replace the light-emitting device 22 to the ONU 20-1 (the replacement message also contains the identifier of the ONU 20-1).

The replacement message d1 may be realized, like the message c1, in a mode in which information about the light-emitting device of the ONU is added to the delay measurement instruction optical packet a1.

[S18] The replacement message d1 reaches all of the ONUs 20-1 to 20-n, but only the ONU 20-1 captures the replacement message d1 based on the identifier of the ONU 20-1 contained in the replacement message d1.

[S19] The light-emitting device 22 installed in the ONU 20-1 is replaced by the maintenance person.

[S20] The ONU 20-1 uses the light-emitting device 22 after replacement to transmit the delay measurement response optical packet b1 to the OLT 10 again.

[S21] The OLT 10 receives the delay measurement response optical packet b1 and the state determination part 16 determines whether or not the optical level of the delay measurement response optical packet b1 transmitted from the ONU 20-1 after the light-emitting device 22 is replaced is within the range of desired levels. Here, it is assumed that the optical level is not within the range of desired levels.

[S22] The OLT 10 regards the optical transmission path F (optical fiber cable) laid between the OLT 10 and the ONU 20-1 as faulty and the outside notification part 18 of the OLT 10 notifies the maintenance person of the fault.

Incidentally, the outside notification part 18 makes not only a notification at step S22, but also a sequential notification to the outside by retaining also a sequence history (history information that the delay measurement response optical packet b1 is not within the range of desired levels or to which ONU increase/decrease index values, the message c1 of level adjustment, or the replacement message d1 was transmitted) of the OLT 10.

The OLT 10 is configured so that, when the level of the delay measurement response optical packet b1 returned from the ONUs 20-1 to 20-n during ranging is not within the range of desired levels, as described above, the message c1 of level adjustment to adjust optical output of the light-emitting device 22 contained in the ONUs 20-1 to 20-n or the replacement message d1 to replace the light-emitting device 22 is transmitted by the OLT 10 to remotely control level compensation of the optical output level of the ONUs 20-1 to 20-n.

Accordingly, not only is the propagation delay time measured and the optical level of signal light transmitted from each ONU detected during ranging, but also, if the optical level of the delay measurement response optical packet is not within the range of desired levels, abnormal light emission of the ONU or an optical transmission path failure between the ONU and the OLT can be detected so that maintainability for performing maintenance and management of a system can greatly be improved.

The control for adjustment or replacement of the optical level of the ONU may be exercised each time a response from the ONU to be measured is received or after delay measurement of all ONUs to be measured.

Figure 5:
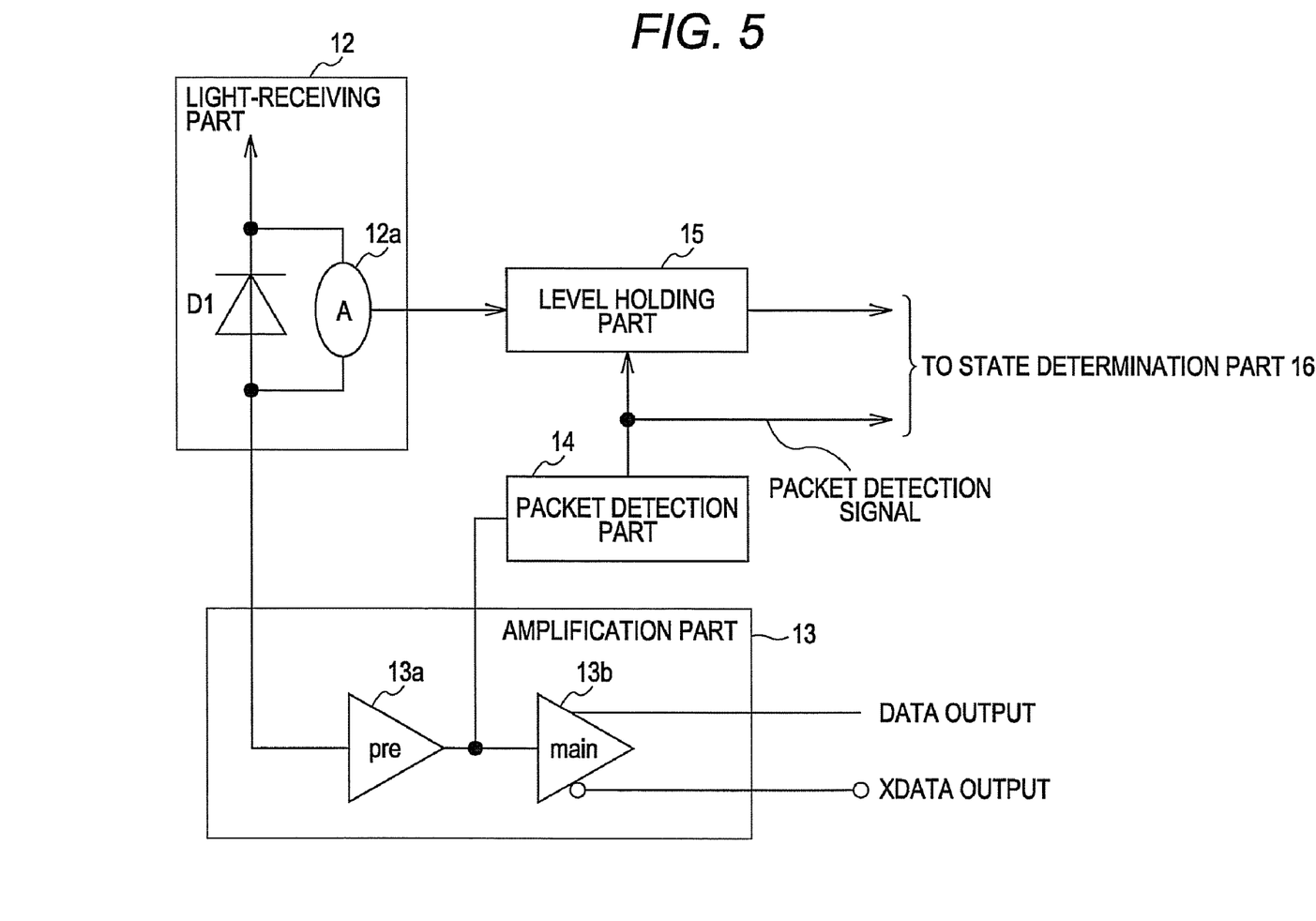
FIG. 5 is a diagram showing the block configuration around a reception part of optical packets.

Next, the configuration of a circuit block around a reception part of optical packets of the OLT 10 will be described. FIG. 5 is a diagram showing the block configuration around a reception part of optical packets. The light-receiving part 12 includes a photodiode D1 and a current detection part 12a and the amplification part 13 includes a preamplifier 13a and a main amplifier 13b.

The photodiode D1 converts a received optical packet into an electric signal (photocurrent) and the current detection part 12a detects the electric signal. The preamplifier 13a amplifies the electric signal and transmits the amplified signal to the packet detection part 14 and the main amplifier 13b. The main amplifier 13b further amplifies the signal amplified by the preamplifier 13a and then outputs the amplified signal as data.

The packet detection part 14 detects reception of an optical packet based on an output signal from the preamplifier 13a and outputs a packet detection signal. The level holding part 15 holds the level of an electric signal after O/E-converted by the light-receiving part 12 using the packet detection signal as a trigger.

Figure 6:
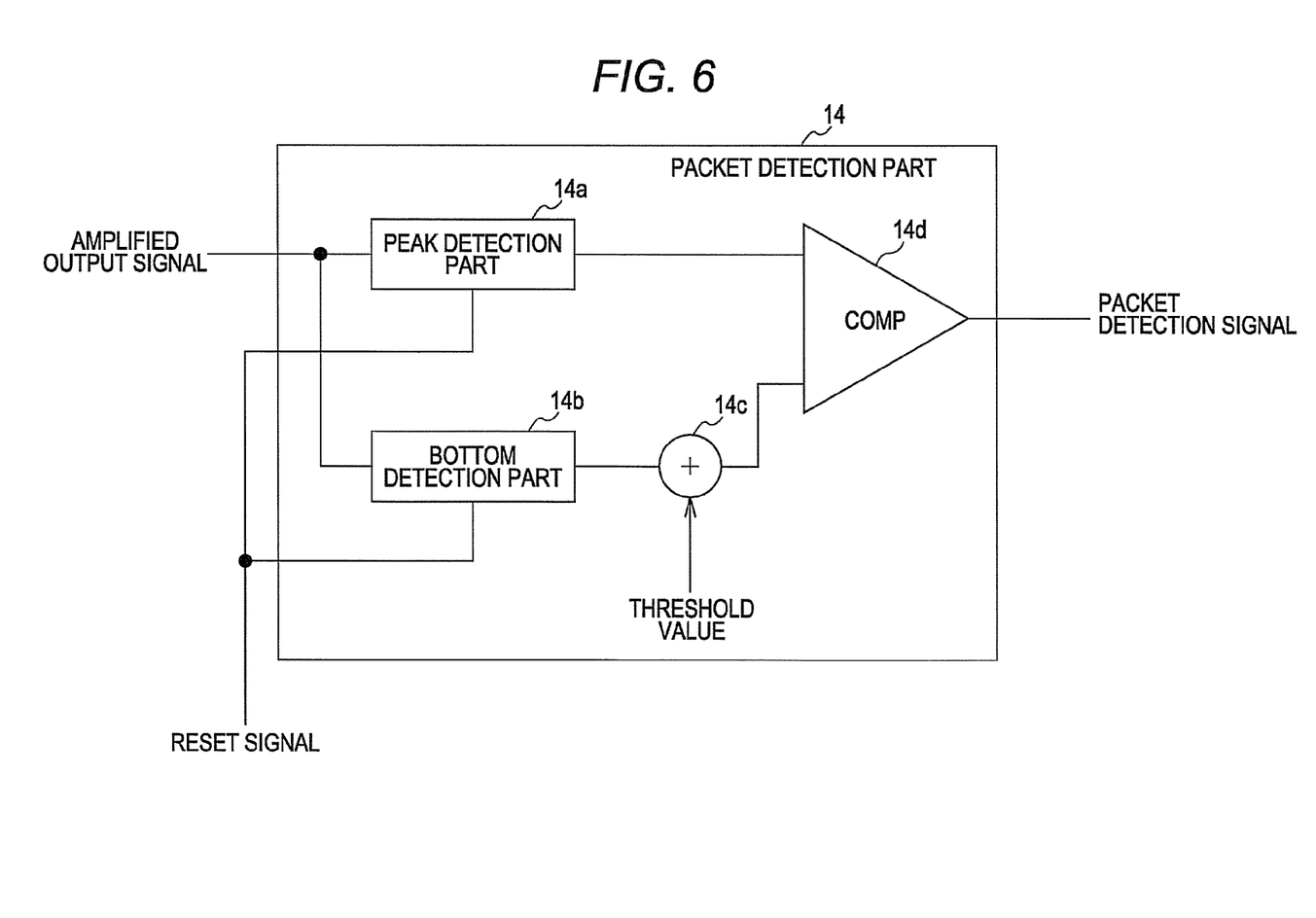
FIG. 6 is a diagram showing the block configuration of a packet detection part.

Next, the configuration and operation of the packet detection part 14 will be described. FIG. 6 is a diagram showing the block configuration of a packet detection part. The packet detection part 14 includes a peak detection part 14a, a bottom detection part 14b, an adder 14c, and a comparator 14d.

An amplified output signal from the preamplifier 13a is input into the peak detection part 14a and the bottom detection part 14b so that the peak detection part 14a detects a peak value of the amplified output signal and the bottom detection part 14b detects a bottom value thereof.

The adder 14c adds a threshold value to determine whether or not an optical packet is received and the bottom value. The comparator 14d compares the peak value with the added value and, if the peak value is larger than the level of the added value, outputs a packet detection signal by assuming that a packet has been detected. A reset signal to set output or non-output of a packet detection signal is input into the peak detection part 14a and the bottom detection part 14b.

Figure 7:
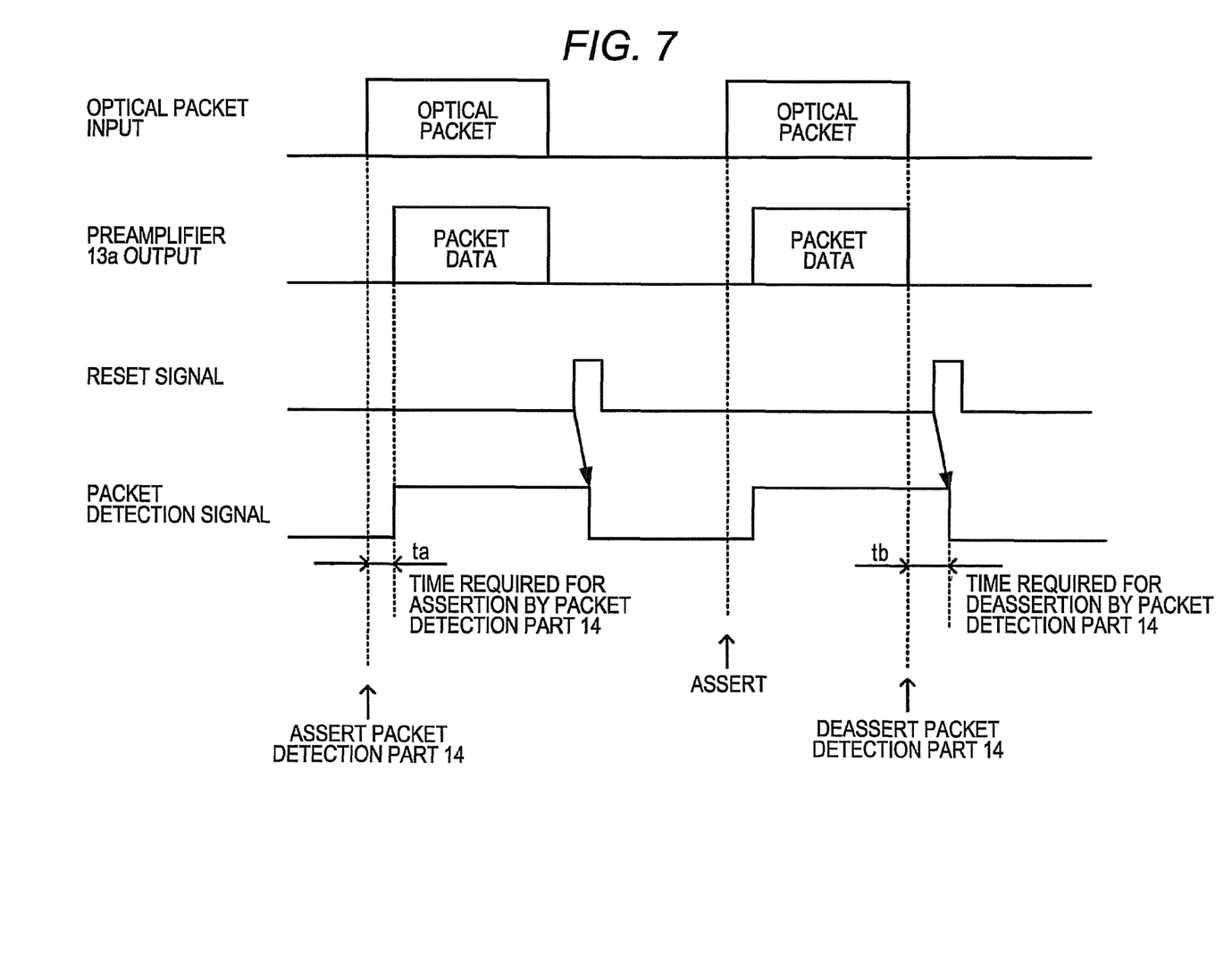
FIG. 7 is a diagram showing an operation time chart of packet detection.

FIG. 7 is a diagram showing an operation time chart of packet detection. When an optical packet is received, the packet detection part 14 is asserted and a packet detection signal is output after the assertion. When the optical packet is gone, a reset signal is input to deassert the packet detection part 14.

ta in FIG. 7 is a time needed for assertion to drive the packet detection part 14 after an assert signal is received and tb is a time needed for deassertion to stop the driving after a deassert signal is received.

Figure 8:
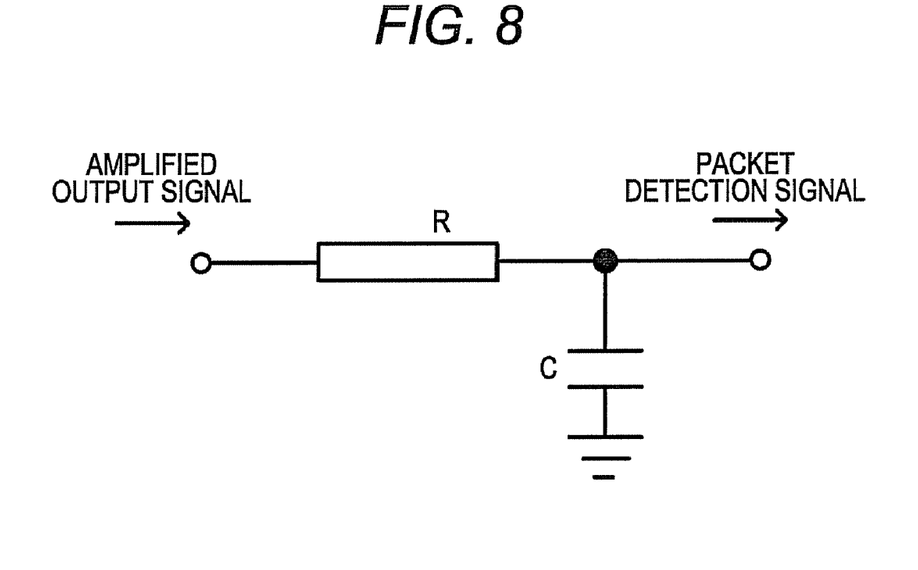
FIG. 8 is a diagram showing a modification of the configuration of the packet detection part.

FIG. 8 is a diagram showing a modification of the configuration of the packet detection part 14. The packet detection part 14 is constructed of a low-pass filter including a resistor R and a capacitor C. An amplified output signal enters one end of the resistor R, the other end of the resistor R is connected to one end of the capacitor C, and the other end of the capacitor C is connected to the ground. A packet detection signal is acquired from a connection point connecting the other end of the resistor R and one end of the capacitor C.

A configuration may be adopted for detection control of packets in which a pilot signal is superimposed on a transmission light packet on the ONUs 20-1 to 20-*n* side and the OLT 10 detects the pilot signal. Superimposition of a pilot signal on an optical packet superimposes a pilot signal on a bias current of the light-emitting device 22 (the superimposition ratio is assumed to be a range in which the existing extinction ratio can be satisfied).

Figure 9:
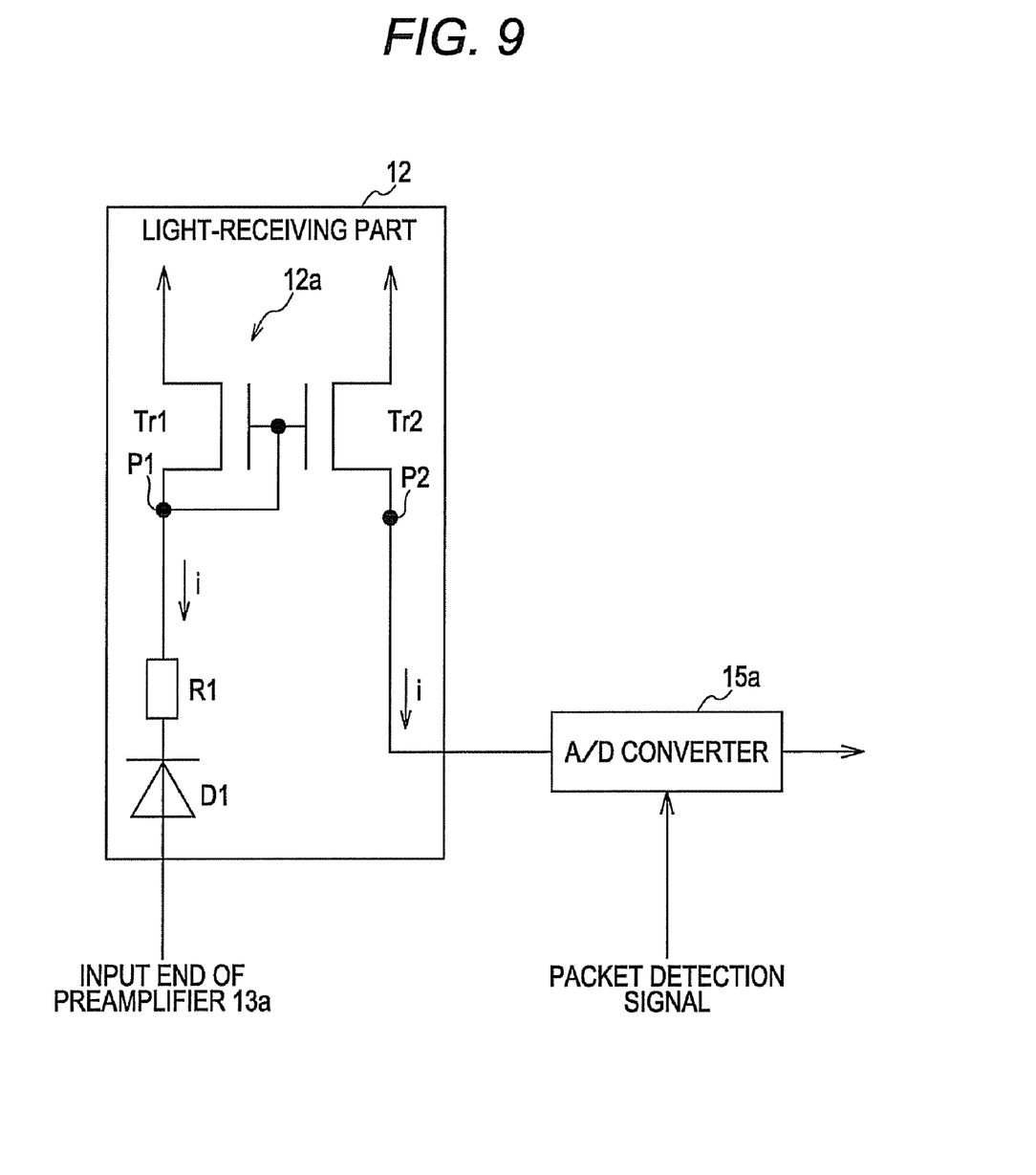
FIG. 9 is a diagram showing the block configuration of a light-receiving part and a level holding part.

Next, the configuration and operation of the light-receiving part 12 and the level holding part 15 will be described. FIG. 9 is a diagram showing the block configuration of the light-receiving part 12 and the level holding part 15. The light-receiving part 12 includes a photodiode D1, which is a photoreceptor, a current mirror circuit 12*a*, which is a current detection part, and a resistor R1 and the level holding part 15 includes an A/D converter 15*a*. The current mirror circuit 12*a* includes transistors Tr1 and Tr2.

A gate of the transistor Tr1, a drain of the transistor Tr1, a gate of the transistor Tr2, and one end of the resistor R1 are connected. The other end of the resistor R1 and a cathode of the photodiode D1 are connected, and sources of the transistors Tr1 and Tr2 are connected to a bias part. An anode of the photodiode D1 is connected to the input end of the preamplifier 13*a* and a drain of the transistor Tr2 is connected to one input terminal of the A/D converter 15*a*. A packet detection signal from the packet detection part 14 is input into the other input terminal of the A/D converter 15*a*.

With the configuration described above, a current i (photocurrent converted by the photodiode D1) flowing through a point P1 is monitored and the same current i (monitoring current) is output from a point P2 to enter the A/D converter 15*a*. The A/D converter 15*a* is triggered by a packet detection signal to convert an analog monitoring electric signal output from the light-receiving part 12 into a digital monitoring electric signal and holds the digital monitoring electric signal.

Figure 10:
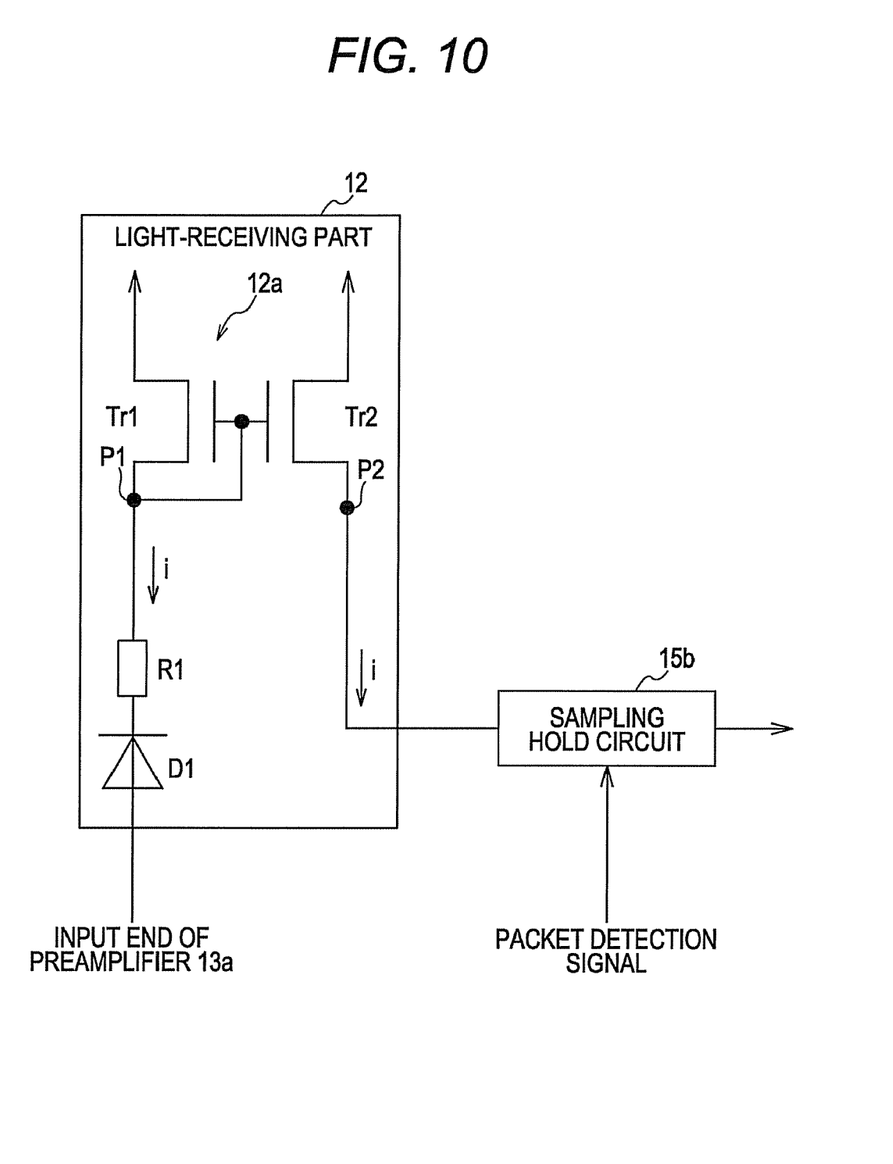
FIG. 10 is a diagram showing a modification of the level holding part.
Figure 11:
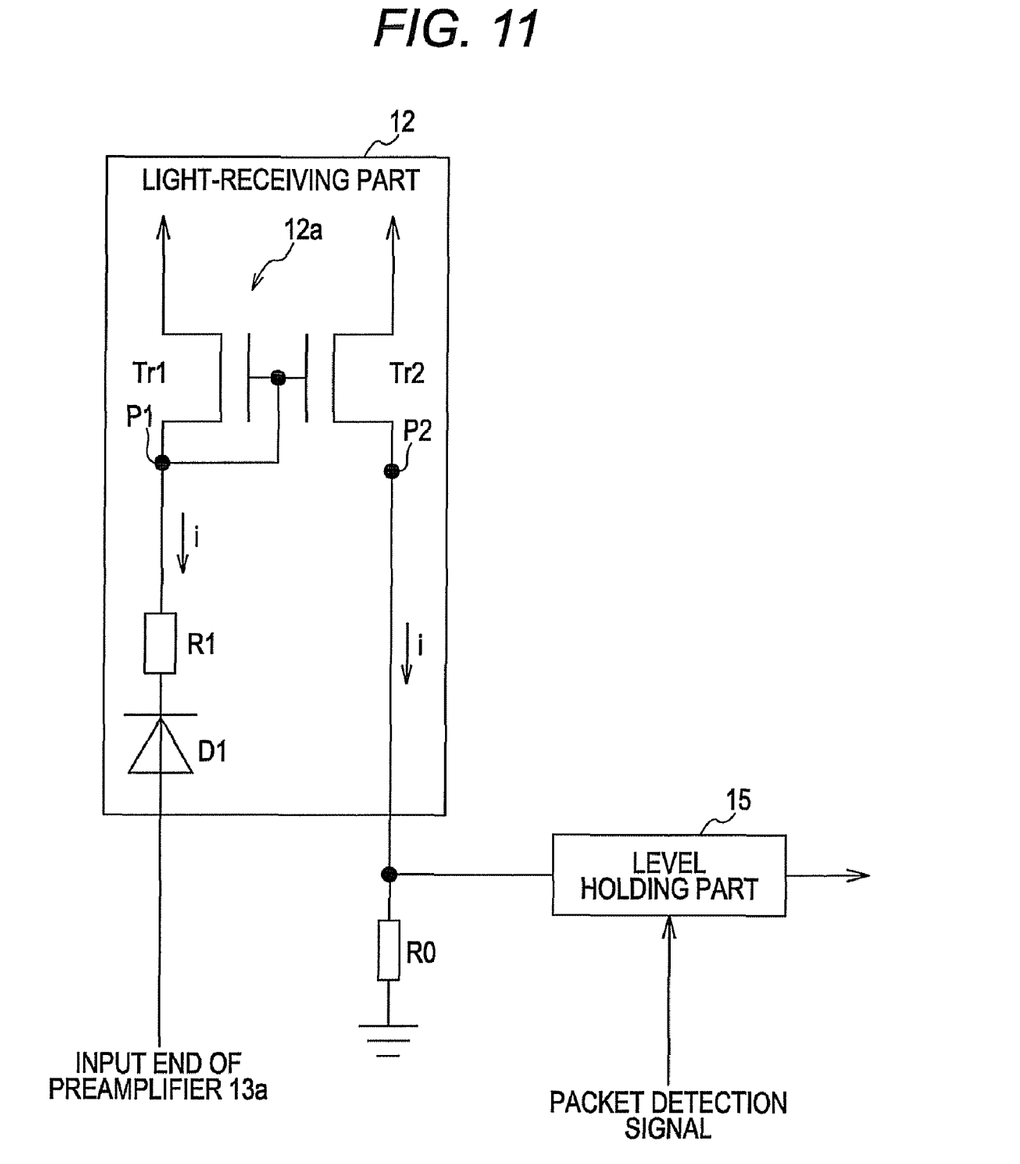
FIG. 11 is a diagram showing a modification of the level holding part.

Next, modifications will be described. FIGS. 10 and 11 are diagrams showing modifications of the level holding part. FIG. 10 uses a sampling hold circuit 15*b* as the level holding part 15, instead of the A/D converter 15*a*. The sampling hold circuit 15*b* is a circuit to sample a monitoring electric signal by a packet detection signal to hold the sampled monitoring electric signal and by using such a circuit, an electric signal output from the light-receiving part 12 can be held.

On the other hand, while the interface between the light-receiving part 12 and the level holding part 15 is a current interface, the interface between the light-receiving part 12 and the level holding part 15 may be made a voltage interface by connecting, as shown in FIG. 11, one end of a resistor R0 to the drain of the transistor Tr2 and the input end of the level holding part 15 and the other end of the resistor R0 to the ground.

All examples and conditional language recited herein for pedagogical purposes to aid the reader in understanding the principles of the invention and the concepts contributed by the inventor to furthering the art, and are to be construed as being without limitation to such specifically recited examples and conditions, nor does the organization of such example in the specification relate to a showing of the superiority and inferiority of the invention. Although the embodiments of the present inventions have been described in detail, it should be understood that the various changes, substitutions, and alterations could be made hereto without departing from the sprit and scope and scope of the invention.

The invention claimed is:

1. An optical transmission apparatus communicable with a plurality of subscriber apparatuses, comprising:
    a delay measurement instruction optical packet transmission part transmitting a delay measurement instruction optical packet;
    a reception part receiving a delay measurement response optical packet returned from each of the plurality of subscriber apparatuses;
    a delay measuring part detecting a response delay time from each subscriber apparatus based on reception timing of each of the delay measurement response optical packets;
    a detection part detecting a received optical level of each of the delay measurement response optical packets received by the reception part; and
    a state determination part determining a quality of an optical transmission state between the optical transmission apparatus and each subscriber apparatus based on the received optical level of the delay measurement response optical packet of each of the plurality of subscriber apparatuses.

2. The optical transmission apparatus according to claim 1, wherein
    the delay measurement instruction optical packet transmission part transmits the delay measurement instruction optical packet including an identifier of the subscriber to be measured, and
    the delay measuring part detects the response delay time from each subscriber based on the reception timing of the delay measurement response optical packet from the subscriber to be measured.

3. The optical transmission apparatus according to claim 1, further comprising a message transmission part that, as a result of the optical transmission state between the optical transmission apparatus and each subscriber determined by the state determination part, transmits a message to control an optical output level to subscribers having a received optical level below a desired level.

4. The optical transmission apparatus according to claim 3, wherein the message includes an identifier of the subscriber to be controlled.

5. A subscriber apparatus connected to an optical transmission apparatus communicable with a plurality of subscriber apparatuses, comprising:
    a delay measurement response interface part that receives a delay measurement instruction optical packet transmitted from the optical transmission apparatus to determine whether or not the delay measurement instruction optical packet is addressed to the subscriber apparatus and, if the delay measurement instruction optical packet is addressed to the subscriber apparatus, outputs a delay measurement response optical packet; and
    an emission quantity control part controlling an optical output level of the delay measurement response optical packet when a message to control the optical output level is received after the delay measurement response optical packet is output.

6. The subscriber apparatus according to claim 5, wherein the delay measurement instruction optical packet and the message contain an identifier of the subscriber apparatus.

7. An optical communication system performing communication by means of an optical network, comprising:
    an optical transmission apparatus comprising:

a delay measurement instruction optical packet transmission part transmitting a delay measurement instruction optical packet;

a reception part receiving a delay measurement response optical packet returned from each of a plurality of subscriber apparatuses;

a delay measuring part detecting a response delay time from each subscriber apparatus based on reception timing of each of the delay measurement response optical packets;

a detection part detecting a received optical level of each of the delay measurement response optical packets received by the reception part; and a state determination part determining a quality of an optical transmission state between the optical transmission apparatus and each subscriber apparatus based on the received optical level of the delay measurement response optical packet of each of the plurality of subscriber apparatuses; and a plurality of subscriber apparatuses, each subscriber apparatus comprising:

a delay measurement response interface part that receives a delay measurement instruction optical packet transmitted from the optical transmission apparatus to determine whether or not the delay measurement instruction optical packet is addressed to the subscriber apparatus and, if the delay measurement instruction optical packet is addressed to the subscriber apparatus, outputs a delay measurement response optical packet; and an emission quantity control part controlling an optical output level of the delay measurement response optical packet when a message to control the optical output level is received after the delay measurement response optical packet is output.

8. The optical communication system according to claim 7, wherein the optical transmission apparatus further comprises a message transmission part that, when the optical level of the delay measurement response optical packet is not within a range of desired levels, transmits a message to the applicable subscriber apparatus, and when the state determination part recognizes that the optical level of the delay measurement response optical packet is not within the range of desired levels, the message transmission part transmits an identifier of the applicable subscriber apparatus and a level adjustment message containing increase/decrease index value information to increase/decrease the optical output level of the delay measurement response optical packet so that the optical level of the delay measurement response optical packet enters a range of desired levels.

9. The optical communication system according to claim 8, wherein when the message is received, the delay measurement response interface part in the subscriber apparatus controls the emission quantity control part based on the increase/decrease index value information to increase/decrease the optical output level and returns the delay measurement response optical packet after the optical output level is adjusted, and when the state determination part of the transmission apparatus recognizes that the optical level of the delay measurement response optical packet received after the level adjustment message is transmitted is not within the range of desired levels, the message transmission part transmits a replacement message containing a replacement instruction to replace a light-emitting device set up in the applicable subscriber apparatus.

* * * * *